July 6, 1965    D. L. McFARLAND ETAL    3,192,882
KITCHEN COUNTER TOP OR THE LIKE
Filed June 17, 1963
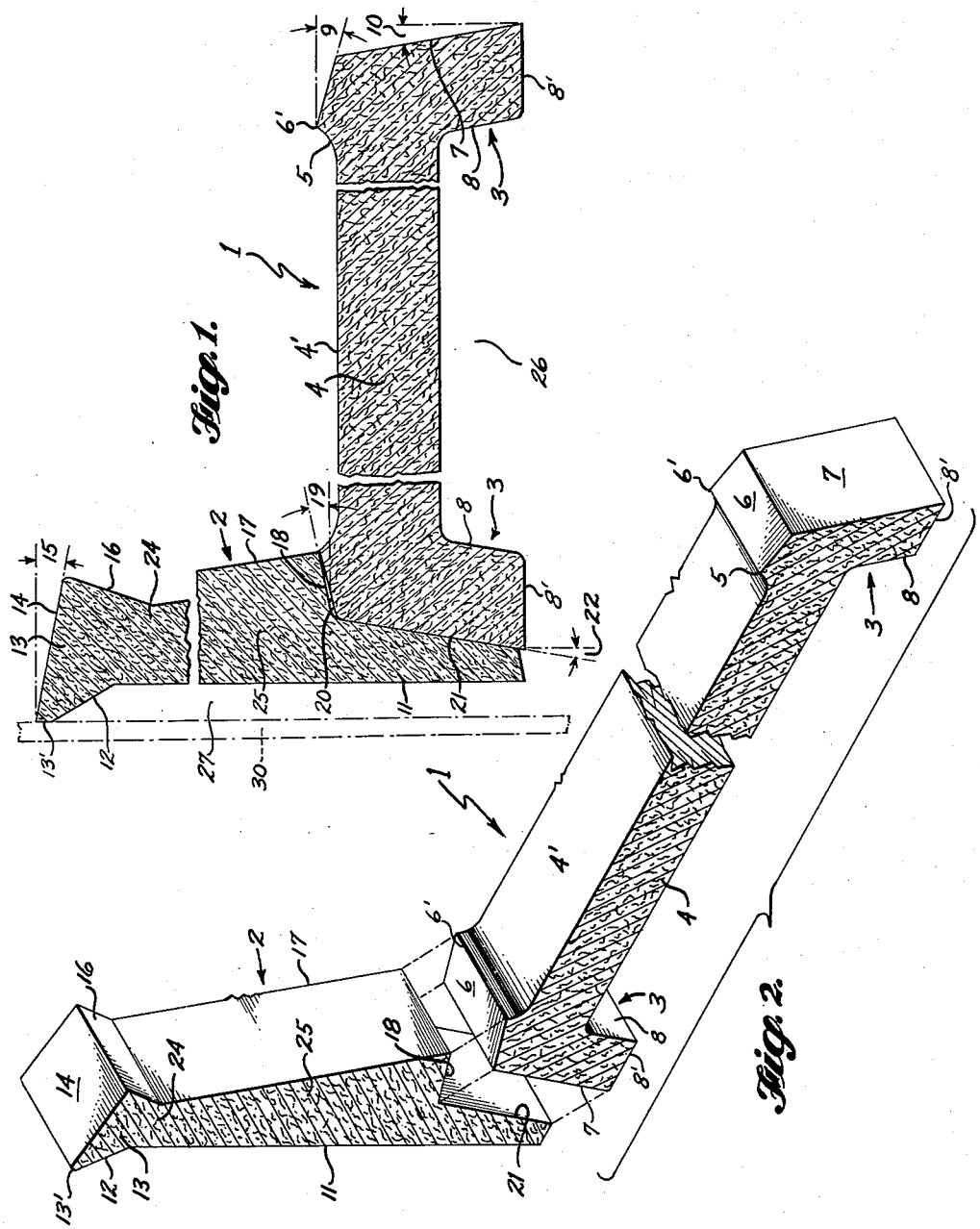
INVENTORS
DONALD L. McFARLAND
JOHN L. BENTY
BY
ATTORNEYS

United States Patent Office 3,192,882
Patented July 6, 1965

3,192,882
KITCHEN COUNTER TOP OR THE LIKE
Donald L. McFarland and John L. Benty, Long Beach, Calif., assignors to Weyerhaeuser Company, Tacoma, Wash., a corporation of Washington
Filed June 17, 1963, Ser. No. 288,339
12 Claims. (Cl. 108—27)

This invention relates to an article of manufacture. More specifically, this invention relates to a composite, unitary, symmetrical article usable as a kitchen counter top or the like and a backsplash article attachable to the counter top.

Heretofore, it has been the practice to fabricate kitchen counter tops or the like from solid wood boards which have been glued together on their longitudinal edges or from sheets of plywood as the base material. These boards or plywood sheets are then covered with a water-resistant material. The exposed edges of the kitchen counter top are usually covered with metal stripping or the like to improve the appearance and to prevent rotting of the boards or sheets from overexposure to water. These kitchen counter tops are then secured in the proper position with a backsplash member secured thereto by bolts or screws normal to the counter top to form a right angle therebetween.

This type of kitchen counter top has proved to be very unsatisfactory primarily because it is subject to decay and rotting due to exposure to water during ordinary use in spite of the precautions taken by the installer.

During ordinary use of this type of kitchen counter top, water accumulates on the upper surface of the counter top and will find its way into the small cracks and crevices between the backsplash and the counter top and between the metal edge stripping and the counter top. This water soaks into the wood to rot and decay it.

Moreover, the water that gets into these cracks and crevices may have dirt, vegetable matter and other types of refuse suspended therein. Due to the construction of the counter top, the housewife or other consumer is unable to properly cleanse it which creates unsanitary conditions in the kitchen. This is largely due to the rigid right angle attachment of the backsplash to the counter top and the edge metal stripping.

The above-described kitchen counter top is additionally deficient in that there is provided no antidrip construction, commonly termed a drip lip. Therefore, water and other matter that gets on the kitchen counter top will flow onto the floor. This is very inconvenient for the housewife or other consumer.

With these disadvantages of the prior art devices in mind, the objects of this invention are:

(1) To provide a composite, unitary, symmetrical article of manufacture usable as a kitchen counter top.

(2) To provide a composite, unitary, symmetrical kitchen counter top provided with a drip lip.

(3) To provide a composite, unitary, symmetrical kitchen counter top that is substantially water-resistant.

(4) To provide a composite, unitary, symmetrical kitchen counter top having a construction that provides for ease in cleansing all parts thereof.

(5) To provide a composite, unitary, symmetrical kitchen counter top that is symmetrical in all respects and a backsplash member that is complementary to the counter top and may be attached thereto with adhesives, screws or the like.

These and other objects and advantages will become manifestly clear to those skilled in the art when taken in conjunction with the detailed description and accompanying drawings, wherein:

FIGURE 1 is a cross-sectional view of the composite, unitary, symmetrical kitchen counter top illustrating the backsplash member in its attached position.

FIGURE 2 is a perspective view of the counter top with the backsplash member spaced laterally away from the counter top.

Referring now to the drawing in general, the kitchen counter top is generally indicated at 1 and comprises a backsplash member 2 and a horizontally extending body member 4 with symmetrically spaced leg members 3 integrally attached to each longitudinal side thereof.

Since each leg member 3 is identical with the other, only one will be described in detail. However, it should be pointed out that the description of the single leg applies equally to the other leg.

The counter top 1 having a horizontal body member 4 intersects the leg member 3 on each side thereof with an arc or curve portion 5. The curve portion 5 extends upwardly to a top surface 6 that is spaced above the upper surface 4' of body member 4. The top surface 6 tapers downwardly and outwardly at an angle 9 of between 10° and 20°, preferably 15° from the horizontal. The upper tapered surface 6 connects to a side wall or portion 7 that inclines downwardly and outwardly. The angle of inclination 10 of side 7 is between 5° and 15°, preferably about 10°, from the vertical.

The leg member 3 is provided with a lower wall 8' that is spaced below the horizontal body portion 4. In this manner, a void space 26 is provided between the body member 4 and the abutting or supporting surface, not shown, so that proper ventilation can be maintained. The lower wall 8' is connected to the lower surface of body member 4 by an inclined wall portion 8.

With this structure, it should be noted that the leg portion 3 extends above the upper surface 4' of the body portion 4 and is integrally joined with the body portion 4 at a curve or arc portion 5 so that no right angle corners are provided. In this manner, a drip lip is formed between the upper portion 6' of the upper leg surface 6 and the upper surface 4' of the horizontal body portion 4. In this manner, water or other liquid material that accumulates on the upper surface 4' of the counter top 1 will not flow over the side and down the side wall 7.

The entire counter top 1 having its horizontal body portion 4 and leg members 3 integrally attached thereto is molded from wood chips, wood fibers or the like mixed with a thermosetting resin that is uncured and cold pressed to form a mat. This mat is placed into a steam chamber or between a pair of heated dies and subjected to heat and pressure to completely cure and form the counter top 1. In this manner, the entire counter top 1 is integrally bound together to form a unitary structure. Therefore, it is clear that no additional parts are necessary to be placed or assembled by the installer other than to place it on proper supports in the kitchen to form the counter top.

After the counter top 1 has been thoroughly cured and cooled, thermosetting resin-impregnated paper or the like may be laminated to the surfaces thereof to give the counter top 1 the proper color and design that is desired.

Alternately, wood chips, wood fibers or the like may be mixed with a thermosetting resin and evenly distributed on a female die of the desired structural shape. The material is then cold pressed to form a consolidated contoured mat or preformed of the finished structure. The preform is placed between sheets of resin-impregnated paper or the like. The thus covered preform is then subjected to a heat pressing in the die which cures the resin binder, forms the wood chips or fibers into the final desired structural shape and laminates the resin-impregnated paper to the surfaces of the formed structure. Preferably, the resin-impregnated paper is applied to all surfaces of the structure so that the structure may be completely encased except for cut edges. Patterned or colored effects may be achieved on the exposed surfaces by overlaying the resin-impregnated paper with resin-impregnated opaque paper carrying an imprint of the pattern or color and surfacing this with a sheet of clear resin such as melamine and laminating the whole in the heat pressing step.

The thermosetting resins usable with the counter top 1 are preferably the urea-formaldehyde resins or phenol-formaldehyde resins that can be applied to the wood chips of fibers at any stage of the process prior to the heat pressing operation but preferably are mixed with the wood chips or fibers in bulk. The finished product will then be structurally sturdy and uniform in all respects and can be readily mounted in the kitchen.

As is most commonly used, a backsplash member 2 is preferably attached to the counter top 1. The backsplash member 2 is also molded from the same material as that used to form the counter top 1. Also, the backsplash member 2 has thermosetting impregnated paper sheets laminated thereto in the same manner as in the case of the counter top 1.

The backsplash member 2 is generally comprised of a body 25 having an upper enlarged portion 13, an intermediate neck portion 24 and a bottom attaching portion 23.

The inner wall or wall that is adjacent to the supporting wall of the room is vertical as shown at 11. The vertical wall 11 intersects an angularly tapered upper portion 12 which in turn intersects another vertical portion 13'. The vertical portion 13' is adapted to abut the wall of the room and provide a space 27 between the wall surface 11 and the wall 30 of the room. In this manner, proper ventilation can be had. The upper horizontal portion 13' intersects a tapered upper surface 14 that inclines in a downwardly and outwardly direction. The angle 15 that the upper tapered surface 14 makes with the horizontal is between 5 and 15° but preferably about 10° from the horizontal.

The upper surface 14 intersects an inclined surface 16 that tapers downwardly and inwardly to form the neck portion 24. The portion 16 intersects another tapered wall portion 17 that inclines downwardly and outwardly. The lower extreme portion of the wall portion 17 exactly coincides with the upper point 6' of tapered surface 6. In this manner, any liquid or water that gets onto the surface 17 will flow downwardly and around the curve portion 5 onto the horizontal portion 4. Accordingly, water will have a tendency to avoid running down the surface 6.

The backsplash member 2 is provided with an inclined supporting section 18. The angle that the section 18 makes with respect to the horizontal is indicated at 19 and can range from 8° to 18°, but is preferably about 13° from the horizontal.

With this construction, a void space 20 is provided between the upper surface 6 and the surface 18. This void 20 is filled with a proper adhesive that is water-resistant to adhere or attach the backsplash member 2 to the counter top 1. Accordingly, water is precluded from flowing onto the surface 6 between the backsplash member 2 and leg member 3.

The angularly extending supporting section 18 intersects an inclined segment 21 that slants downwardly and outwardly at an angle indicated at 22. The angle 22 is preferably the same as the angle 10 so that the surfaces 7 on the leg 3 and the segment 21 are complementary to each other. The surfaces 21 and 7 will receive a suitable adhesive to aid in securing the backsplash member 2 to the leg member 3.

It should be noted that the counter top 1 disclosed is substantially sealed against the attack of water due to its construction. Moreover, there are no sharp right angle corners on the backsplash member 2 or the counter top 1 to accumulate dirt and other grimy material that tends to accumulate on most counter tops. In any event, if dirt or other grime does accumulate on these surfaces, they can be readily cleaned by the user. Moreover, a drip lip construction is disclosed at 6 and 6' to aid in maintaining water or other liquid that accumulates on the upper surface 4' of the body member 4 on the counter top rather than allowing the fluids to flow onto the floor.

While specific details of a preferred embodiment have been set forth above, it will be apparent that many changes and modifications may be made therein without departing from the spirit of the invention. It will therefore be understood that what has been described herein is intended to be illustrative only, and is not intended to limit the scope of the invention.

We claim:

1. An integrally molded composite, unitary, symmetrical counter top formed of wood fibers bound together with a thermosetting resin and having a thermosetting resin-impregnated sheet laminated thereto, comprising: a horizontally extending body member having spaced leg members integrally connected thereto, each leg member being comprised of an upper surface inclined downwardly and outwardly and spaced above the upper surface of said horizontally extending body member to provide a drip lip, said upper inclined surface being connected to said upper surface of said horizontally extending body member by a curved portion, an outer side surface inclined downwardly and outwardly, a bottom surface spaced below said body member to provide a space below said body member and an inner side surface extending upwardly from said bottom surface to said body member.

2. An integrally molded composite, unitary, symmetrical counter top in accordance with claim 1 wherein the angle of inclination of said upper surface of said legs is between 10° and 20° from the horizontal.

3. An integrally molded composite, unitary, symmetrical counter top in accordance with claim 1 wherein said angle of inclination of said upper surface of said legs is 15° from the horizontal.

4. An integrally molded composite, unitary, symmetrical counter top in accordance with claim 1 wherein the angle of inclination of said outer side surface is between 5 and 15° from the vertical.

5. An integrally molded composite, unitary, symmetrical counter top in accordance with claim 1 wherein the angle of inclination of said outer side surface is 10° from the vertical.

6. The subject matter as set forth in claim 1 wherein the angle of inclination of said upper surface of said legs is between 10 and 20° from the horizontal and the angle of inclination of said outer side surface is between 5 and 15° from the vertical.

7. The subject matter of claim 1 wherein the angle of inclination of said upper surface of said legs is 15° from the horizontal and the angle of inclination of said outer side surface is 10° from the vertical.

8. The combination of; an integrally molded composite, unitary, symmetrical counter top and an integrally molded composite, unitary, backsplash member, said counter top and said backsplash member being formed of wood chips or the like bound together with a thermosetting resin and having thermosetting resin-impregnated sheets laminated thereto, said counter top comprising a horizontally extending body member having spaced leg members integrally connected thereto, said backsplash member being connected to one of said leg members, each of said leg members being comprised of an upper surface inclined downwardly and outwardly and spaced above the upper surface of said horizontally extending body member to provide a drip lip, said upper inclined surface being connected to said upper surface of said horizontally extending body by a curved portion, an outer side surface inclined downwardly and outwardly, a bottom surface spaced below said body member to provide a space below said body member, and an inner side surface extending upwardly from said bottom surface to said body member.

9. The combination of claim 8 wherein: said upper inclined surface on said leg member is inclined at the range of from 10 to 20°, and said backsplash member being provided with a supporting abutment extending inwardly and downwardly from the interior surface thereof at an angle of from between 8 and 18°, said angle on said upper surface of said leg being greater than the angle of said supporting abutment on said backsplash member to provide a void space between said abutment on said backsplash and said upper surface when said backsplash member is attached to said counter top.

10. The combination of claim 8 wherein said outer side surface of said leg member is inclined at an angle of from 5° to 15° and said backsplash member is provided with a complementary surface thereon so that said backsplash member may be attached to said counter top.

11. The combination of claim 9 wherein the angle of said upper surface on said leg member is 15° and the angle of said outer side surface on said leg member is 10°, the angle of said supporting abutment on said backsplash member being 13° to provide a void space between said abutment on said backsplash member and the upper surface of said leg member.

12. The combination of claim 8 wherein said backsplash member is provided with a vertical surface adapted to be spaced from the wall of a room by an upper enlarged portion, said backsplash member being provided with an inclined surface that coincides with the curved portion on said counter top whereby any liquid being placed on said inclined surface of said backsplash member will readily flow down onto the counter top.

References Cited by the Examiner

UNITED STATES PATENTS

| | | | |
|---|---|---|---|
| 1,333,553 | 3/20 | Martinet | 20—15 |
| 2,096,908 | 10/37 | Lytle | 20—15 |
| 2,614,014 | 10/52 | Stanitz | 108—27 |
| 2,654,648 | 10/53 | Burke | 108—27 |
| 2,688,523 | 9/54 | Norman et al. | 108—27 |
| 2,717,187 | 9/55 | Morgan et al. | 20—15 |
| 2,876,053 | 3/59 | Eves | 20—15 |
| 3,080,268 | 3/63 | Bjork | 20—15 X |
| 3,103,042 | 9/63 | Martin | 250—15 |

FRANK B. SHERRY, *Primary Examiner.*